United States Patent
Song et al.

(10) Patent No.: US 11,816,791 B2
(45) Date of Patent: Nov. 14, 2023

(54) IMAGE PROCESSING METHOD AND APPARATUS USING THE SAME

(71) Applicant: MEDIT CORP., Seoul (KR)

(72) Inventors: Myoung Woo Song, Seoul (KR); Beom Sik Suh, Seoul (KR)

(73) Assignee: MEDIT CORP., Seoul (KR)

(*) Notice: Subject to any disclaimer, the term of this patent is extended or adjusted under 35 U.S.C. 154(b) by 0 days.

(21) Appl. No.: 17/483,994

(22) Filed: Sep. 24, 2021

(65) Prior Publication Data

US 2022/0101598 A1 Mar. 31, 2022

(30) Foreign Application Priority Data

Sep. 25, 2020 (KR) .................. 10-2020-0125058
Nov. 13, 2020 (KR) .................. 10-2020-0151742

(51) Int. Cl.
*G06T 17/00* (2006.01)
*G06T 19/00* (2011.01)

(52) U.S. Cl.
CPC .............. *G06T 17/00* (2013.01); *G06T 19/00* (2013.01); *G06T 2210/41* (2013.01)

(58) Field of Classification Search
CPC ....... G06T 19/00; G06T 15/503; G06T 17/00; G06T 19/20; G06T 2219/2012; G06T 2210/41
See application file for complete search history.

(56) References Cited

U.S. PATENT DOCUMENTS

| 10,888,400 | B2 * | 1/2021 | Elbaz ................ A61B 5/1079 |
| 2017/0098315 | A1 * | 4/2017 | Hara ................... A61B 6/583 |
| 2018/0336666 | A1 * | 11/2018 | Kim ..................... H04N 23/80 |
| 2019/0110077 | A1 * | 4/2019 | Kim ................... H04N 19/159 |
| 2019/0231491 | A1 * | 8/2019 | Sabina ............... A61B 5/0086 |
| 2019/0231492 | A1 * | 8/2019 | Sabina ............ A61B 1/000096 |

FOREIGN PATENT DOCUMENTS

| KR | 10-2014-0015239 A | 2/2014 |
| KR | 10-2017-0020210 A | 2/2017 |
| KR | 10-1994398 B1 | 6/2019 |
| KR | 10-2020-0099997 A | 8/2020 |
| WO | 98/24065 A1 | 6/1998 |

OTHER PUBLICATIONS

First office action dated Aug. 31, 2021 from the Korean Intellectual Property Office for Korean Application No. 10-2020-0151742.
Extended European Search Report dated Feb. 28, 2022 for European Application No. 21198350.7.
Extended European Search Report dated Aug. 31, 2023 for European Application No. 21198350.7.

* cited by examiner

*Primary Examiner* — Abderrahim Merouan
(74) *Attorney, Agent, or Firm* — INSIGHT LAW GROUP, PLLC; Seung Lee

(57) ABSTRACT

An image processing method may include steps of obtaining a plurality of image data from an object, generating, from the image data, a three-dimensional (3-D) model having at least two different representation modes, and displaying the generated 3-D model. There is an advantage in that a user can check various information of a 3-D model without changing a representation mode by displaying a 3-D model having at least two different representation modes.

16 Claims, 11 Drawing Sheets

FIG. 5

| Density of data | $1 \leq x < x_c$ | $x \geq x_c$ |
|---|---|---|
| Indication level | 1 | 2 |
| Color | Red | Green |

FIG. 6

| Density of data | $1 \leq x < x_1$ | $x_1 \leq x < x_2$ | $x_2 \leq x < x_3$ | $x_3 \leq x < x_c$ | $x \geq x_c$ |
|---|---|---|---|---|---|
| Indication level | 1 | 2 | 3 | 4 | 5 |
| Color | Red | Pink | Orange | Yellow | Green |

FIG. 7

| Density of data | $1 \leq x < x_c$ | $x \geq x_c$ |
|---|---|---|
| Indication level | 1 | 2 |
| Color | Purple | Purple |
| Transparency | 0% | 100% |

FIG. 8

| Density of data | $1 \leq x < x_1$ | $x_1 \leq x < x_2$ | $x_2 \leq x < x_3$ | $x_3 \leq x < x_c$ | $x \geq x_c$ |
|---|---|---|---|---|---|
| Indication level | 1 | 2 | 3 | 4 | 5 |
| Color | Purple | Purple | Purple | Purple | Purple |
| Transparency | 0% | 25% | 50% | 75% | 100% |

IMAGE PROCESSING METHOD AND APPARATUS USING THE SAME

CROSS-REFERENCE TO RELATED APPLICATIONS

This application claims the benefit of Korean Patent Application Nos. 10-2020-0125058, filed Sep. 25, 2020, and 10-2020-0151742, filed Nov. 13, 2020, in the Korean Intellectual Property Office, the disclosures of which are incorporated herein in their entirety by reference.

BACKGROUND

1. Technical Field

The present disclosure relates to an image processing method and an apparatus using the same.

2. Related Art

A three-dimensional (3-D) scanning technology is used in various industry fields, such as measurement, tests, reverse engineering, content creation, CAD/CAM, and medical devices, and practicality thereof is further expanded due to the improvement of scanning performance attributable to the development of the computing technology.

In a process of generating a 3-D model through a 3-D scanner, the 3-D scanner obtains all of 3-D model data by converting, into a 3-D model, images obtained by photographing a measurement target. Furthermore, as the measurement target is thoroughly photographed, an image obtained by the 3-D scanner is increased. Accordingly, reliability of the final data for a 3-D model converted in real time is improved.

Recently, research and development for increasing the precision and reliability of the final data of a measurement target and improving user convenience by allowing a user to check the results of scanning in real time in order to induce additional scanning for a portion having low reliability during 3-D scanning are actively carried out.

PRIOR ART DOCUMENT

Patent Document (Patent Document 1) Korean Patent Application Publication No. 10-2017-0020210 (Feb. 22, 2017)

SUMMARY

Various embodiments are directed to providing an image processing method of allowing a 3-D model to have at least two different representation modes in a step of generating a 3-D model and displaying the 3-D model having the at least two different representation modes in real time in a display step.

Furthermore, various embodiments are directed to providing an image processing apparatus using the image processing method, which generates a 3-D model having at least two different representation modes so that a separate switching process between representation modes is not required and displays the 3-D model on a display unit.

Technical objects to be achieved in the present disclosure are not limited to the aforementioned technical objects, and other technical objects not described above may be evidently understood by those skilled in the art from the following description.

In an embodiment, an image processing method includes a step of obtaining a plurality of image data from an object, a step of generating, from the image data, a three-dimensional (3-D) model having at least two different representation modes, and a display step of displaying the 3-D model having the at least two different representation modes.

Furthermore, the step of generating the 3-D model includes steps of obtaining characteristic information from the image data and generating a 3-D model having the characteristic information. The characteristic information includes reliability and object representation information.

Furthermore, the reliability includes at least one of the density of data corresponding to an overlap area between the image data and a scan angle at which the image data is scanned.

Furthermore, the representation modes include a reliability mode including the reliability and a texture mode including the object representation information.

Furthermore, the reliability mode and the texture mode are overlaid and displayed.

Furthermore, in the reliability mode, the reliability is indicated by given reliability indication means. The reliability indication means is at least one of a given color, a pattern or transparency.

Furthermore, in the texture mode, a texture indication degree of texture indication means indicative of the object representation information is changed based on the reliability. As the reliability is increased, a ratio of the texture indication degree is increased.

In the reliability mode, a reliability indication degree of reliability indication means is changed based on the reliability. As the reliability is increased, a ratio of the reliability indication degree is decreased.

Furthermore, as the reliability is increased, a ratio of a texture indication degree is increased, and a ratio of a reliability indication degree is decreased.

Furthermore, the reliability is divided into at least two reliability indication levels.

Furthermore, different transparency is assigned to the reliability indication levels for each reliability indication level. The transparency is differentially assigned based on the reliability indication level.

Furthermore, the transparency is divided and assigned based on the number of reliability indication levels in a range of 0% to 100%.

In an embodiment, an image processing apparatus includes a scan unit configured to scan an object, a controller configured to generate a three-dimensional (3-D) model having at least two different representation modes from a plurality of image data of the object, and a display unit configured to display the 3-D model having the at least two different representation modes.

Furthermore, the controller obtains characteristic information from the image data, and generates a 3-D model having the characteristic information. The characteristic information includes reliability and object representation information.

Furthermore, the reliability includes at least one of the density of data corresponding to an overlap area between the image data and a scan angle at which the image data is scanned.

Furthermore, the representation modes include a reliability mode including the reliability and a texture mode including the object representation information.

Furthermore, the reliability mode and the texture mode are overlaid and displayed.

Furthermore, the controller indicates the reliability by using given reliability indication means. The reliability indication means is at least one of a given color, a pattern or transparency.

Furthermore, in the texture mode, a texture indication degree of texture indication means indicative of the object representation information is changed based on the reliability. As the reliability is increased, a ratio of the texture indication degree is increased.

In the reliability mode, a reliability indication degree of reliability indication means is changed based on the reliability. As the reliability is increased, a ratio of the reliability indication degree is decreased.

Furthermore, as the reliability is increased, a ratio of a texture indication degree is increased, and a ratio of a reliability indication degree is decreased.

Furthermore, the reliability is divided into at least two reliability indication levels.

Furthermore, the controller assigns different transparency for each reliability indication level. The transparency is differentially assigned based on the reliability indication level.

Furthermore, the controller divides and assigns the transparency based on the number of reliability indication levels in a range of 0% to 100%.

According to the present disclosure, inconvenience in which the reliability mode and the texture mode are changed conventionally is solved by generating a 3-D model having the reliability mode and the texture mode and displaying both the reliability mode and the texture mode.

Furthermore, a user can easily check whether a 3-D model having high reliability has been obtained because an indication level is changed in response to a change in reliability and reliability indication means corresponding to the indication level is indicated.

BRIEF DESCRIPTION OF THE DRAWINGS

FIGS. 5 to 8 are diagrams for describing that that characteristic information including indication levels is additionally assigned based on reliability.

DESCRIPTION OF REFERENCE NUMERALS

Figure 1:
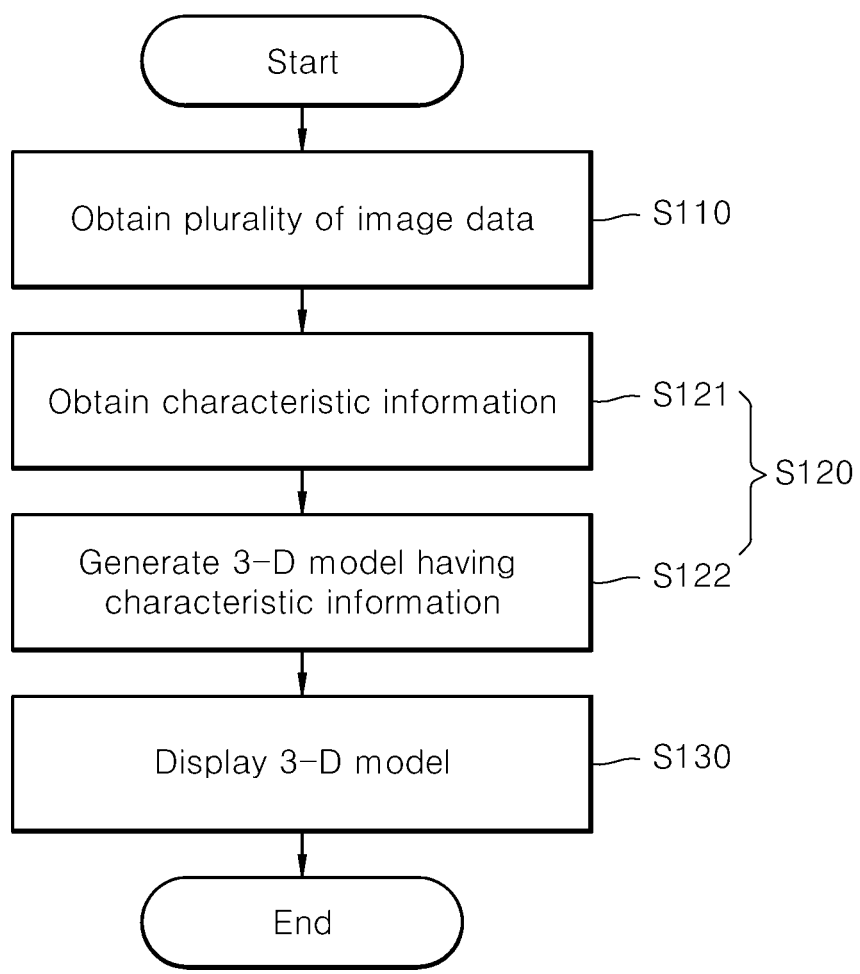
FIG. 1 is a flowchart of an image processing method according to the present disclosure.

S110: step of obtaining image data
S120: step of generating 3-D model
S121: step of obtaining characteristic information
S122: step of generating 3-D model having characteristic information
S150: display step
S210: step of determining critical density
S220: step of detecting minimum density of data
S230: step of indicating scan angle range
I: image data M: 3-D model
i: image data (in UI) m: 3-D model (in UI)
Ti: initial data Tn: new data
Tf: update data 10: image processing apparatus
100: scan unit 200: controller
210: characteristic information acquisition unit
220: 3-D model generation unit
230: additional characteristic information assignment unit
250: 3-D model supplementation unit
300: display unit

DETAILED DESCRIPTION

Hereinafter, some embodiments of the present disclosure will be described in detail with reference to exemplary drawings. In adding reference numerals to the elements of each drawing, it should be noted that the same elements have the same reference numerals as much as possible even if they are indicated in different drawings. Furthermore, in describing embodiments of the present disclosure, when it is determined that a detailed description of the related well-known configuration or function hinders understanding of an embodiment of the present disclosure, the detailed description thereof will be omitted.

Furthermore, in describing elements of an embodiment of the present disclosure, terms, such as a first, a second, A, B, (a), and (b), may be used. Such terms are used only to distinguish one component from the other component, and the essence, order, or sequence of a corresponding component is not limited by the terms. All terms used herein, including technical or scientific terms, have the same meanings as those commonly understood by a person having ordinary knowledge in the art to which an embodiment pertains, unless defined otherwise in the specification. Terms, such as those commonly used and defined in dictionaries, should be construed as having the same meanings as those in the context of a related technology, and are not construed as being ideal or excessively formal unless explicitly defined otherwise in the specification.

FIG. 1 is a flowchart of an image processing method according to the present disclosure.

Referring to FIG. 1, the image processing method according to the present disclosure includes step S110 of obtaining a plurality of image data from an object, step S120 of generating a three-dimensional (3-D) model having at least two different representation modes from the image data, and a display step S130 of displaying the 3-D model having the at least two different representation modes.

The image processing method according to the present disclosure has a technical spirit in which a 3-D model has at least two different representation modes and a texture mode and reliability mode of the 3-D model are displayed in a process of generating the 3-D model of an object. Hereinafter, a process of displaying various information by obtaining a 3-D model of an object (e.g., the object means the inside of the mouth of a patient including teeth, gums, etc.) by using a 3-D scanner is described as an example of the image processing method according to the present disclosure, for convenience of description.

According to an embodiment of the image processing method according to the present disclosure, image data of an object for the inside of the mouth of a patient is obtained (S110). In this case, the image data of the object may be obtained in plural. As the number of image data obtained is increased, the reliability of a generated 3-D model is further increased. The obtained image data may mean a shot of a two-dimensional (2-D) or a 3-D image. At least one image data may be obtained, but a plurality of image data may be obtained within a range in which a system memory and a required scan time are not inefficiently wasted in order to improve reliability to be described later.

In step S110 of obtaining image data, in order to obtain an image, an RGB light source may be used or at least one of methods, such as 1-D line scan, triangulation through structured light, a confocal method, etc. may be used.

In step S110 of obtaining image data, a 3-D intraoral scanner for scanning the inside of the mouth of a patient may be used. In this case, a 3-D model is displayed in real time. The reliability of an object is also updated in real time. However, in step S110 of obtaining image data, a 3-D table scanner for scanning a plaster cast, etc. may be used. In this case, only the finally processed 3-D model of a 3-D model is displayed, and the reliability of the finally processed 3-D model may be displayed. In step S110 of obtaining image data, if the 3-D intraoral scanner is used, a reliability change can be checked in real time. If the 3-D table scanner is used, a 3-D model having relatively high reliability may be obtained.

Figure 2:
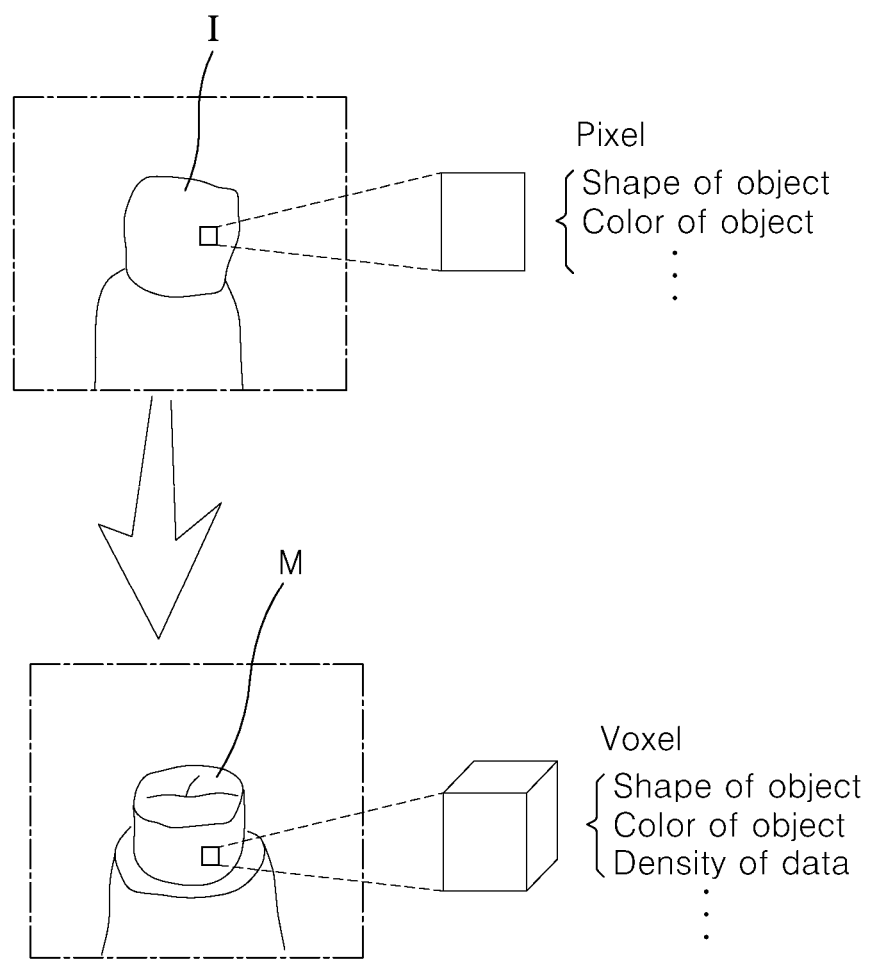
FIG. 2 is a diagram for describing that image data is converted into a 3-D model.

FIG. 2 is a diagram for describing that image data is converted into a 3-D model.

Referring to FIG. 2, image data I obtained by scanning an object may include at least one pixel. The pixel is a minimum unit having a given area and constituting image data. As the number of pixels included in the image data I is increased, the image data I may be represented with high resolution.

In step S120 of generating a 3-D model, a 3-D model M may be generated in real time from the image data I. In step S120 of generating a 3-D model, various methods for 3-D modeling may be used. For example, the 3-D model M may be generated using the aforementioned triangulation through structured light, a marker, a laser, etc.

The generated 3-D model M includes at least one voxel. The voxel is a minimum unit having a given volume and constituting the 3-D model M. As the number of voxels included in the 3-D model M is increased, the 3-D model M may be represented with high resolution. The voxel corresponds to a pixel of the image data I. Given information of a corresponding pixel may be assigned to a voxel generated at a specific location.

In the image processing method according to the present disclosure, step S120 of generating a 3-D model may include step S121 of obtaining characteristic information from the obtained image data I.

In this case, the characteristic information may mean parameters that represents a feature or property of the image data I obtained by scanning an object. For example, characteristic information includes representation information of an object. The representation information of the object means information of the object which may be checked based on the results of modeling for the object, such a shape of the object or a color of the object. For example, when a scan object is an intraoral tooth, the results of modeling for a shape, a size, a color, etc. of the tooth may be obtained from the image data I obtained by scanning the tooth. The results become representation information of the scan object.

The characteristic information may be obtained from each of pixels included in the image data I. Each pixel has characteristic information at a location of the image data I where a corresponding pixel is disposed.

The characteristic information may mean reliability. The reliability may include at least one of the density of data and a scan angle. The density of data may mean the number of image data overlapped at a given location if a plurality of image data I is obtained and an overlap area occurs between the image data I. Reliability indication means may be changed depending on the density of data. The scan angle may mean an angle of a scanner for scanning an object. A "location" of the image data I may correspond to a given point or area of an object.

The number of image data obtained is increased by continuously obtaining a plurality of image data at a given point or area of an object. Accordingly, the density of the data is increased. When an overlap portion occurs between neighboring image data I when the plurality of image data I is obtained, the image data I may be aligned so that overlapped portions are connected. At least one of commonly known methods may be used as a method of aligning the image data I. For example, an iterative closest point (ICP) method may be used as the method of aligning the image data I.

The characteristic information may further include an indication level corresponding to reliability, if necessary. More specifically, the reliability may be divided into at least two indication levels each having a given section. Contents related to the indication level will be described later.

Furthermore, step S120 of generating a 3-D model may include step S122 of generating a 3-D model having characteristic information. The characteristic information obtained in step S121 of obtaining characteristic information may be assigned to a voxel of a 3-D model. The voxel may correspond to a pixel of image data. Accordingly, characteristic information included in a pixel formed at a given location may be assigned to a voxel. As described above, the assigned characteristic information may include the density of data and representation information of an object.

The 3-D model generated in step S120 of generating a 3-D model has at least two different representation modes. For example, a 3-D model may include a reliability mode including reliability and a texture mode including object representation information. The reliability mode may visually indicate whether a reliable 3-D model of an object has been obtained. The texture mode may visually indicate a surface feature or a surface property of an object, that is, representation information of an object.

When a 3-D model is generated, the display step S130 of displaying the 3-D model having at least two different representation modes in real time may be performed. In the display step S130, a 3-D model generated by scanning an object through a 3-D scanner is displayed on a display device. In this case, a representation mode in which the 3-D model is displayed may include the texture mode. In the texture mode, some of characteristic information of a voxel included in the 3-D model may also be displayed. Characteristic information which may be displayed may be representation information (e.g., a color of an object or a shape of the object) of the object. In the display step S130, a 3-D model including all of at least two different representation modes may be displayed to a user through a known output device (e.g., a monitor).

A color of an object among representation information of the object may be obtained through a camera and a color image sensor electrically connected to a 3-D scanner. A color of the object may be obtained using at least one of various color models. For example, the color models may include a gray model, an RGB model, an HSV model, a YCbCr model, a CMYK model, etc. The gray model is an achromatic color-based color model, and provides only brightness information. In the texture mode, in order to easily display a color of an object, the color of the object may be obtained by a color model based on a chromatic color.

A representation mode in which a 3-D model is displayed may include the reliability mode. In the reliability mode, characteristic information of a voxel included in a 3-D model may also be indicated. In this case, characteristic information which may be indicated in the reliability mode may be different from characteristic information which may be indicated in the texture mode. For example, characteristic information which may be indicated in the reliability mode may be the density of data. The density of data may be indicated through reliability indication means to be described later.

Figure 3:
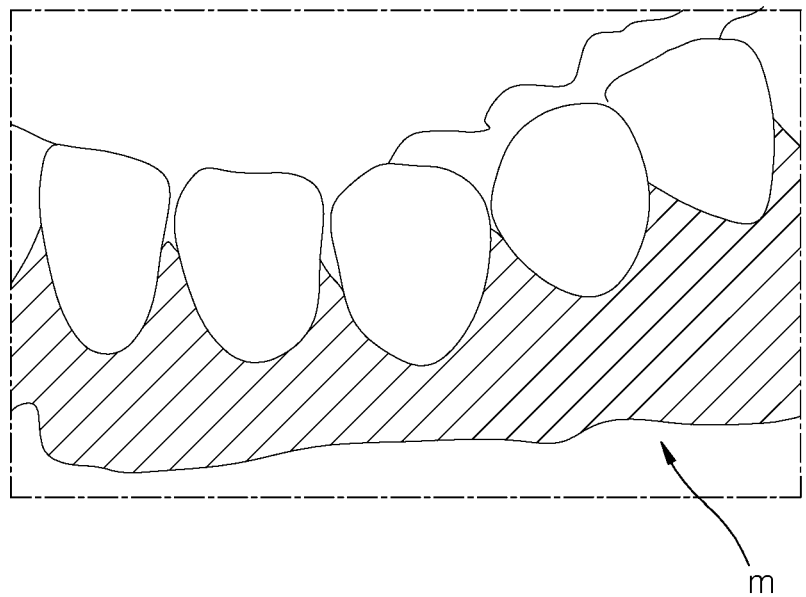
FIGS. 3 and 4 are comparison examples in which two different modes are separately displayed.
Figure 4:
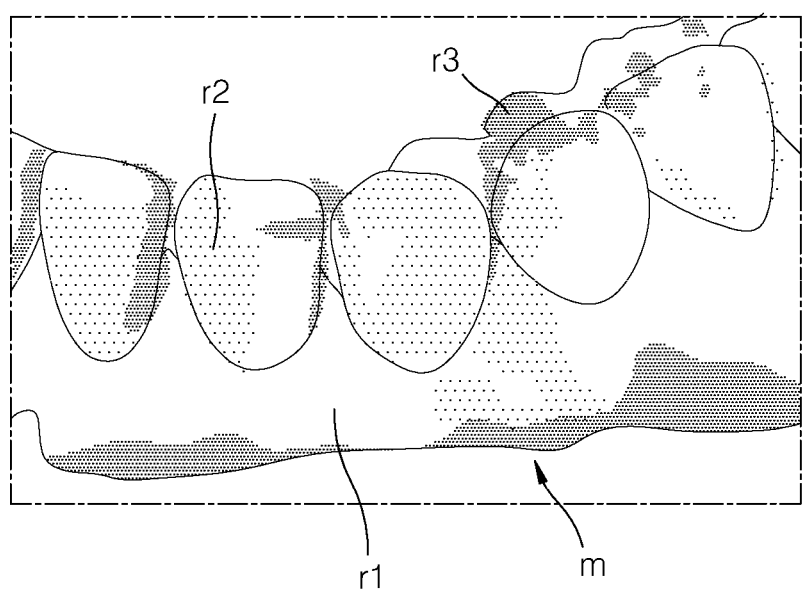

FIGS. 3 and 4 are comparison examples in which different two modes are separately displayed. More specifically, FIG. 3 is a 3-D model displayed as the texture mode according to a comparison example of the present disclosure. FIG. 4 is a 3-D model displayed as the reliability mode according to a comparison example of the present disclosure.

Comparison examples in which the texture mode in which object representation information is indicated and the reliability mode in which reliability according to the density of data of an object appearing are separately displayed may be taken into consideration. In this case, a user needs to separately check the texture mode and the reliability mode.

Referring to FIG. 4, in the reliability mode, a first reliability color "r1", second reliability color "r2", and third reliability color "r3" of a 3-D model "m" are represented as different patterns or colors, but an actual color of the 3-D model cannot be known. Accordingly, according to the comparison example of the present disclosure, in order to check a color of an object, a user watches a 3-D model in the texture mode and has to inconveniently change the texture mode into the reliability mode in order to check the reliability of the 3-D model. In particular, in order to change the texture mode and the reliability mode, a user has to inconveniently move to an input device (e.g., a keyboard or a mouse) disposed at a location separated from an object. Furthermore, in a process of alternately performing the scanning of an object and a manipulation of the input device, a problem in that a patient is exposed to an insanitary environment may occur.

In the image processing method according to the present disclosure, in order to solve problems with the comparison example, the texture mode and the reliability mode are represented in one integrated mode without switching between the texture mode and the reliability mode. Accordingly, a sanitary treatment environment is provided to a patient, and a convenient work environment is provided to a user.

More specifically, the image processing method according to the present disclosure may include the display step S130 of displaying a 3-D model having at least two different representation modes in real time. In this case, a representation mode may include the reliability mode including reliability and the texture mode including object representation information.

Substantially, at an early stage when an object is scanned, the reliability of a 3-D model is low because the density of data is low. To check texture of the 3-D model having low reliability is meaningless, and there is a possibility that inaccurate treatment may be provided to a patient. Accordingly, the reliability mode and the texture mode may be overlaid and displayed. More specifically, the reliability mode may be overlaid and displayed on the texture mode. That is, the reliability mode may be first displayed to a user prior to the texture mode so that a low reliability portion of a 3-D model can be easily checked. A high reliability portion of the 3-D model may be displayed to a user in the texture mode in which object representation information is indicated. As a result, the reliability mode and the texture mode can be displayed to a user at the same time.

Hereinafter, a process of indicating reliability by given reliability indication means in the reliability mode and dividing reliability into at least two indication levels is described in detail. For example, a process of dividing reliability into indication levels based on the density of data and visually indicating the density of the data by reliability indication means is described.

When reliability is obtained, the reliability may be indicated by given reliability indication means in the reliability mode. In this case, the reliability indication means may be at least one of a specific color, a pattern, and transparency. The reliability indication means indicated in the reliability mode visually indicate reliability, so that a user can easily check a degree of reliability obtained according to a portion in a 3-D model.

FIGS. 5 to 8 are diagrams for describing that characteristic information including reliability indication levels is additionally assigned based on the densities of data.

Referring to FIGS. 5 to 8, in the reliability mode, the densities of data may be classified into at least two reliability indication levels in a way to correspond to pixels of image data.

In reliability indication levels, the densities of accumulated data may be classified into given sections, and indication means divided with respect to the respective sections may be used. That is, in reliability indication levels, given reliability indication means may be assigned to a voxel for each reliability indication level. In this case, the reliability indication means may be a specific color or a specific pattern. Furthermore, the reliability indication means may be transparency. The reliability indication means assigned to the voxel may be indicated in a 3-D model.

FIG. 5 illustrates that sections are divided into two reliability indication levels based on the densities of data. Although not illustrated, when the density of data is 0 in a 3-D model, reliability is not present because the 3-D model is not generated. When the density of data is 1 or more to less than xc, an indication level "1" may be assigned. In this case, "xc" may be a critical density determined to have sufficient reliability.

A first color (e.g., red) may be additionally assigned as reliability indication means so that the reliability indication level "1" corresponds to the assigned reliability indication level "1." Accordingly, a voxel having the density of data of 1 or more to less than xc is indicated as the first color.

When the density of data is xc or more, a reliability indication level "2" may be assigned to a corresponding voxel. Furthermore, a second color may be additionally assigned as reliability indication means in a way to correspond to the reliability indication level "2." The second color may be a color different from the first color. For example, the second color may be green. A user can easily check that a reliable amount of data has been accumulated because the second color is different from the first color.

As illustrated in FIG. 6, reliability indication levels may be classified into five based on the densities of data. However, the number of reliability indication levels is not limited, and may be set as a number by which the densities of data can be effectively distinguished. If reliability indication levels are classified into five, the reliability indication levels may have at least one intermediate critical density x1, x2, and x3 between the density of data of 0 and a critical density of xc. The intermediate critical densities x1, x2, and x3 may have equal values, but may not have equal values. In this case, in order to indicate a reliability change according to a uniform criterion, the intermediate critical densities may be formed at equal intervals between the density of data of 0 and the critical density xc. When the density of data is 1 or more to less than x1, a reliability indication level "1" may be assigned to a voxel. When the density of data is x1 or more to less than x2, a reliability indication level "2" may be assigned to a voxel. When the density of data is x2 or more to less than x3, a reliability indication level "3" may be assigned to a voxel. When the density of data is x3 or more to less than xc, a reliability indication level "4" may be assigned to a voxel. When the density of data is xc or more, a reliability indication level "5" may be assigned to a voxel. Furthermore, as described above, different reliability indication means corresponding to the respective reliability indication levels may be additionally assigned. For example, a first color may be additionally assigned to the voxel to which the reliability indication level "1" has been assigned. A second color may be additionally assigned to the voxel to which the reliability indication level "2" has been assigned. A third color may be additionally assigned to the voxel to which the reliability indication level "3" has been assigned. A fourth color may be additionally assigned to the voxel to which the reliability indication level "4" has been assigned. A fifth color may be additionally assigned to the voxel to which the reliability indication level "5" has been assigned. The assigned first to fifth colors may be indicated in the reliability mode. In this case, the first color to the fifth color may have different colors so that a change in the reliability indication level can be easily checked.

The aforementioned contents have been described by taking the density of data as an example, but the present disclosure is not limited thereto. Reliability may be measured by various elements including the density of data, a scan angle, etc.

Reliability indication levels may have different ratios for each reliability indication level. That is, in order to describe that reliability indication levels have different ratios, texture indication means is defined as a relative concept of the reliability indication means. The texture indication means may be a color of an object among object representation information. In this case, the reliability indication means on the reliability mode side and the texture indication means on the texture mode side may be synthesized to generate information which is checked by a user. Accordingly, the texture indication means and the reliability indication means may be assigned different weights, may be synthesized as a relationship of a ratio, and may be indicated on a display device. Equation 1 related to the corresponding synthesis is proposed as follows.

$$A*y+B*(1-y) \qquad \text{[Equation 1]}$$

(A: the texture indication means on the texture mode side, B: the reliability indication means on the reliability mode side, and y: the weight. In this case, y is a real number between 0 and 1)

According to Equation 1, a 3-D model displayed to a user may be represented as the sum of a texture indication degree indicated by the texture indication means indicative of object representation information and a reliability indication degree indicated by the reliability indication means. In this case, the texture indication degree may mean a degree that the texture indication means is indicated. The reliability indication degree may mean a degree that the reliability indication means is indicated. According to Equation 1, when a ratio (i.e., the weight y) occupied by the texture indication means on the texture mode side is increased, a ratio (1-y) occupied by the reliability indication means on the reliability mode side is decreased. Likewise, when the ratio occupied by the texture indication means on the texture mode side is decreased, the ratio occupied by the reliability indication means on the reliability mode side is increased. More specifically, the sum of the ratio (i.e., the weight y) of the texture indication degree and the ratio (1-y) of the reliability indication degree may be 1. Accordingly, in the display step S130, reliability indication means on the reliability mode side may have a reliability indication degree decreased as the density of data is increased and a reliability indication level on the reliability mode side is increased, and may be gradually indicated as texture indication means on the texture mode side. Accordingly, there are advantages in that the reliability of a voxel can be intuitively checked and both a color and reliability of an object can be checked in one display mode.

According to another embodiment, texture indication means and reliability indication means may be synthesized and indicated on a display device. Equation 2 related to the corresponding synthesis is proposed as follows.

$$A+B*(1-y) \qquad \text{[Equation 2]}$$

(A: the texture indication means on the texture mode side, B: the reliability indication means on the reliability mode side, and y: a weight. In this case, y is a real number between 0 and 1)

According to Equation 2, the texture indication means on the texture mode side is constant. However, a ratio occupied by the reliability indication means on the reliability mode side is gradually decreased as reliability is increased. More specifically, in a low reliability state, the reliability indication means may be overlapped and displayed on the texture indication means. As reliability is increased through scanning, the ratio (1-y) of the reliability indication means on the reliability mode side gradually decreases and converges on 0. Accordingly, in the display step S130, as the density of data is increased, a reliability indication level on the reliability mode side is increased, and a reliability indication degree is decreased, reliability indication means on the reliability mode side gradually disappears. As a result, only texture indication means on the texture mode side may be indicated. Accordingly, there are advantages in that the reliability of a voxel can be intuitively checked and both a color and reliability of an object can be checked in one display mode.

In order to further easily indicate a reliability change for each reliability indication level, a concept of "transparency" may be introduced. For example, a reliability color used as reliability indication means may be at least one of an RGBA model or an HSL model. That is, a color model including transparency may be used as reliability indication means.

Referring to FIG. 7, the densities of data are classified into at least two reliability indication levels as in FIGS. 5 and 6, but transparency may be used as reliability indication means unlike in FIGS. 5 and 6.

For example, when the density of data is 1 or more to less than xc, a reliability indication level "1" may be assigned. In this case, xc may be a critical density determined to have sufficient reliability. A specific color and first transparency may be additionally assigned as reliability indication means in a way to correspond to the assigned reliability indication level "1." For example, purple and transparency of 0% may be assigned to a voxel to which the reliability indication level "1" has been assigned. Accordingly, when the density of data is 1 or more to less than xc, object representation information in the texture mode is covered with the reliability indication means and not indicated.

When the density of data is xc or more, a reliability indication level "2" may be assigned to a corresponding voxel. Furthermore, second transparency may be additionally assigned as reliability indication means in a way to correspond to the reliability indication level "2." The second transparency may have a value different from that of the first transparency. For example, the second transparency may be 100%. Since the second transparency has a value different from that of the first transparency, a user can easily check that a reliable amount of data has been accumulated. When the indication level is "2" and reliability indication means has transparency of 100%, a color of the reliability indication means in a corresponding voxel is removed, and object representation information (e.g., a color of an object) is indicated. Accordingly, a user can more easily check both reliability and an actual color of an object. That is, when the reliability indication level is increased, the transparency is increased but a reliability indication degree is decreased. As a result, when a reliable amount of data is accumulated, reliability indication means may fully disappear and only object representation information may be indicated.

FIG. 8 illustrates an example in which the densities of data are classified into five reliability indication levels. In this case, different transparency may be applied for each reliability indication level. The transparency may be applied in proportion to the reliability indication level. Accordingly, as the reliability indication level is increased, transparency of reliability indication means is also increased. As a result, as data is accumulated, a reliability indication color gradually disappears.

The transparency may be divided and assigned at given intervals based on the number of reliability indication levels within a range of 0% to 100%. For example, transparency of 0% may be assigned to a reliability indication level "1", transparency of 25% may be assigned to a reliability indication level "2", transparency of 50% may be assigned to a reliability indication level "3", transparency of 75% may be assigned to a reliability indication level "4", and transparency of 100% may be assigned to a reliability indication level "5." When the density of data is a critical density or more, it is determined that the amount of data having high reliability has been accumulated in a corresponding voxel, and object representation information of a 3-D model may be indicated by removing a reliability indication color. Accordingly, a user can perform additional scan on a portion of the 3-D model having a remaining reliability indication color, and can obtain the 3-D model generally having good quality.

Figure 9:
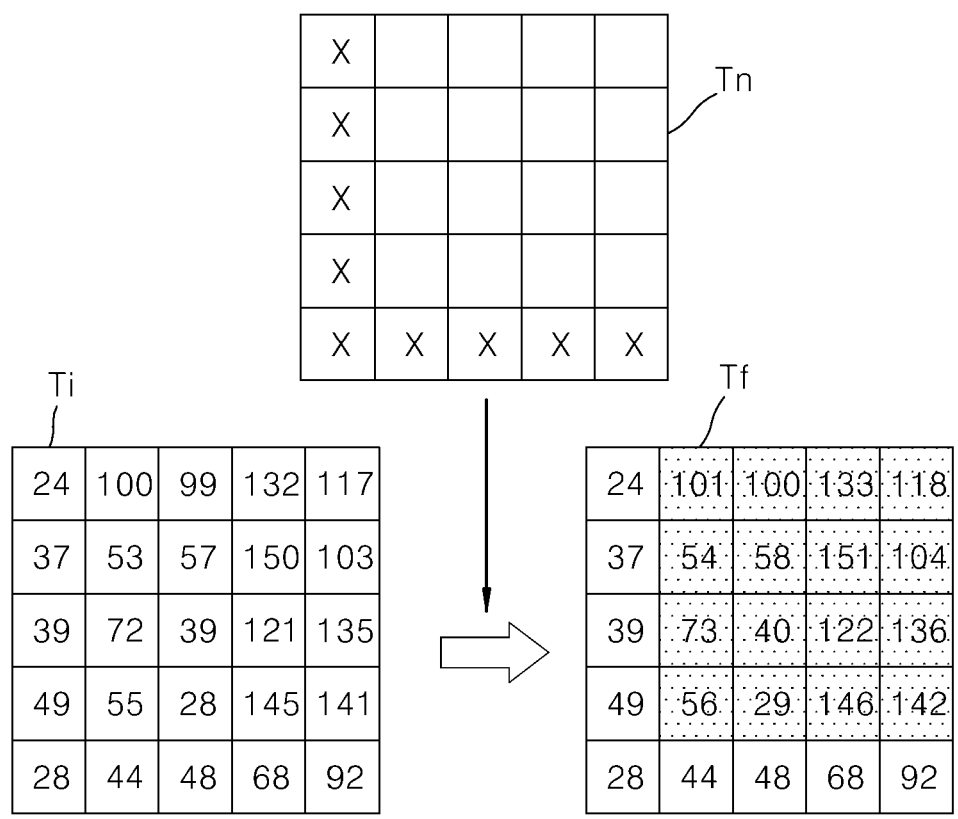
FIGS. 9 and 10 are diagrams for describing critical densities.
Figures 10, 11:
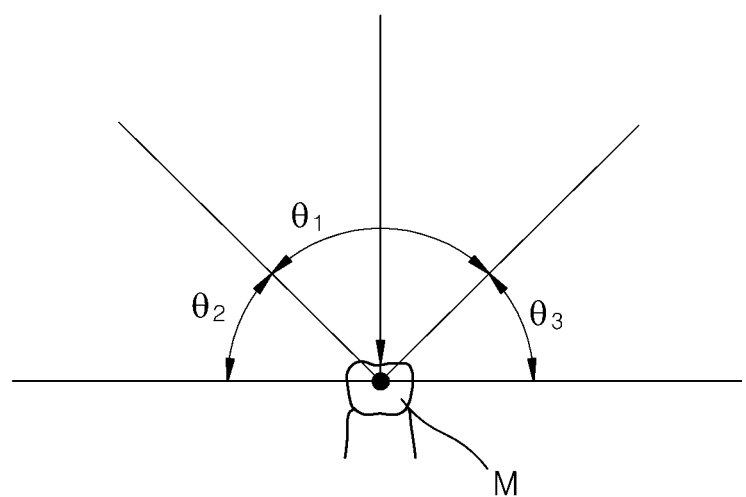
FIG. 11 is a diagram for describing a scan angle range.

FIGS. 9 and 10 are diagrams for describing critical densities.

Referring to FIGS. 9 and 10, the density of data may be updated in response to the acquisition of image data. The density of data may be updated only up to a critical density. Initial data Ti, new data Tn, and update data Tf may mean image data, that is, a set of pixels, or a 3-D model, that is, a set of voxels. For convenience of description, the initial data Ti, the new data Tn, and the update data Tf are considered to have been obtained by simplifying a 3-D model, that is, a set of voxels, but the present disclosure is not limited thereto. For example, the new data Tn may be aligned and overlapped with the initial data Ti having a critical density set to 500. In this case, the new data Tn may be overlapped with some or all of the initial data Ti. A portion indicated by "X" is a portion in which the new data Tn does not overlap the initial data Ti. A portion not indicated by "X" is a portion in which the new data Tn overlaps the initial data Ti.

Referring to FIG. 9, a process of updating the density of data with respect to a portion in which the new data Tn and the initial data Ti are overlapped is described. The density of data has been assigned to each voxel, and the density of the data including the overlapped new data Tn in the voxel may be updated. However, referring to FIG. 10, the density of data in a voxel in which the density of data has reached a critical density among portions in which the new data Tn and the initial data Ti are overlapped is not updated. Since the density of data in a voxel in which the density of the data has reached the critical density is not updated, an apparatus using the image processing method according to the present disclosure can be prevented from excessively using a storage space, and system resources can be reduced.

Hereinafter, a selective update of the density of data based on a scan angle range is described.

FIG. 11 is a diagram for describing a scan angle range.

A 3-D model has to be scanned at multiple angles in order to obtain data having high reliability. That is, although the same point is scanned in the same time, it is preferred to scan the corresponding point in multiple directions rather than scanning the corresponding point in one direction. As illustrated in FIG. 11, a first scan angle range $\theta 1$ may be formed from a scan start angle. A second scan angle range $\theta 2$ and a third scan angle range $\theta 3$ neighboring the first scan angle range may be formed. FIG. 11 illustrates that scan angle ranges have been formed with respect to one angle element. A scan angle range for at least one of angle elements, such as a roll, a yaw, and a pitch, may be formed, if necessary.

For example, it is assumed that a total critical density xc is 300, a first sub-critical density ($x_{\theta 1}$) assigned to the first scan angle range $\theta 1$ is 100, a second sub-critical density ($x_{\theta 2}$) assigned to the second scan angle range $\theta 2$ is 100, and a third sub-critical density ($x_{\theta 3}$) assigned to the third scan angle range $\theta 3$ is 100 (the first sub-critical density to the third sub-critical density are not illustrated).

In this case, in each of the scan angle ranges $\theta 1$, $\theta 2$, and $\theta 3$, data may be accumulated up to the density of data corresponding to each critical density. For example, when the density of data in the first scan angle range $\theta 1$ is 100, the density of data in the second scan angle range $\theta 2$ is 70, and the density of data in the third scan angle range $\theta 3$ is 50, the density of data in a corresponding voxel has not reached the total critical density xc. However, if the density of data is updated in order to obtain data having high reliability, although an object is scanned in the first scan angle range $\theta 1$, the density of data in a corresponding voxel is not updated. Accordingly, in order to improve the reliability of the corresponding voxel, a user needs to additionally scan the object in the second scan angle range $\theta 2$ or the third scan angle range $\theta 3$. As described above, since the density of data is updated only up to a sub-critical density for each scan angle range, a user can be induced to scan an object in multiple directions in order to obtain data having high reliability, and overall reliability of a 3-D model can be improved.

Furthermore, in the image processing method according to the present disclosure, when the density of data is a critical density or less, step S200 of supplementing the density of the data may be additionally performed.

Figure 12:
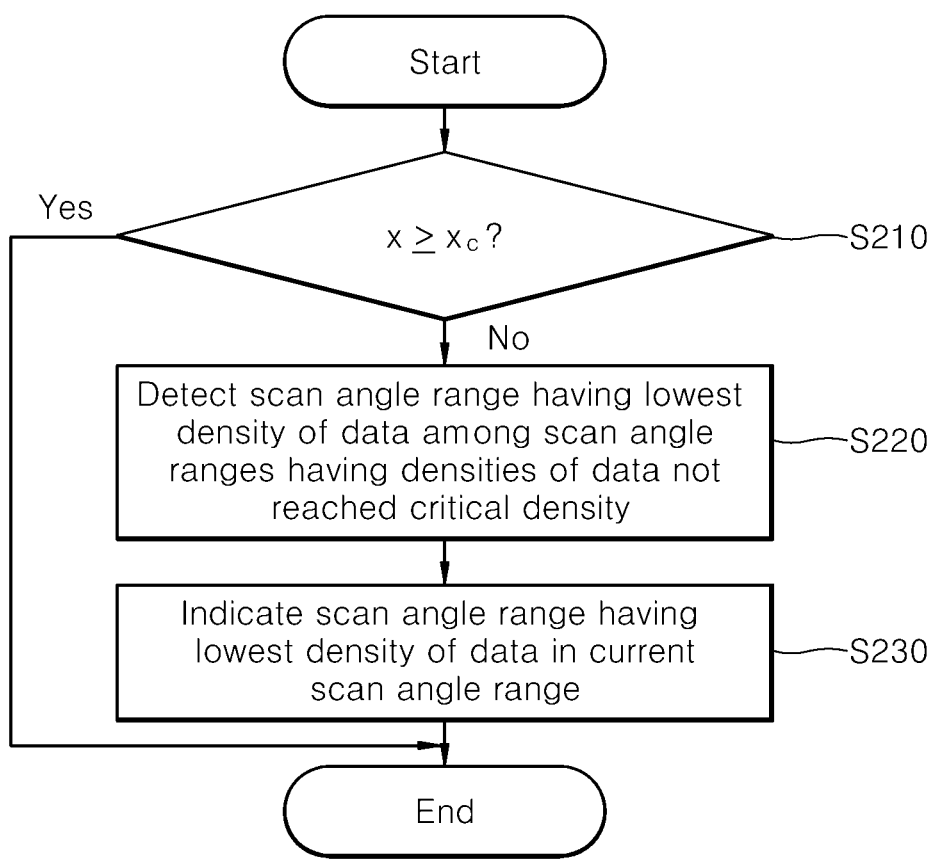
FIG. 12 is a diagram for describing a step of supplementing the density of data based on a scan angle range.

FIG. 12 is a diagram for describing step S200 of supplementing the density of data based on a scan angle range. Referring to FIG. 12, whether the density of data assigned to a given voxel is the critical density xc or more is determined (S210). When the density of the data assigned to the given voxel is the critical density xc or more, it is determined that sufficient data has been accumulated in the corresponding voxel. However, when the density of the data assigned to the given voxel is less than the critical density xc, a scan angle range in which the density of data has not reached a sub-critical density is detected by confirming the sub-critical density of each scan angle range. In the aforementioned example, the density of data in the first scan angle range has reached the first sub-critical density, but the densities of data in the second scan angle range and the third scan angle range have not reached the second sub-critical density and the third sub-critical density, respectively. In this case, a scan angle range having the lowest density of data may be detected (S220). Reliability may be supplemented by indicating the corresponding scan angle range (S230). For example, if a scan angle range on which scanning is now performed is the first scan angle range and a scan angle range on which supplementation needs to be performed is the second scan angle range, a notification message, such as "Incline to the left and perform scanning", may be displayed on a display device, etc. A user can recognize a corresponding message, etc., and can obtain a 3-D model having higher reliability by additionally scanning an object in a scan angle range in which the density of data has not reached a sub-critical density.

Figure 13:
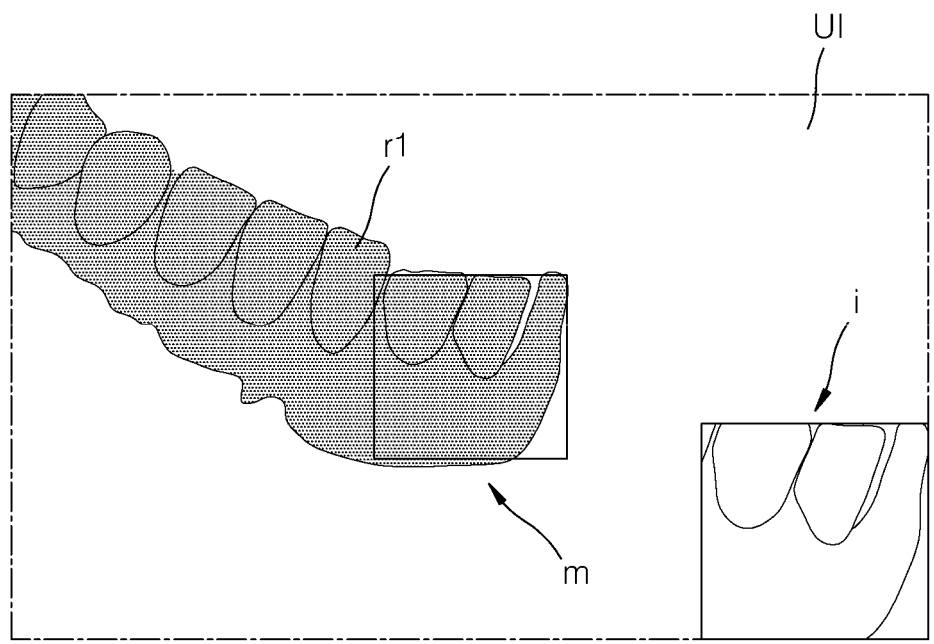
FIGS. 13 to 15 are diagrams illustrating 3-D models displayed using the image processing method according to the present disclosure.
Figure 14:
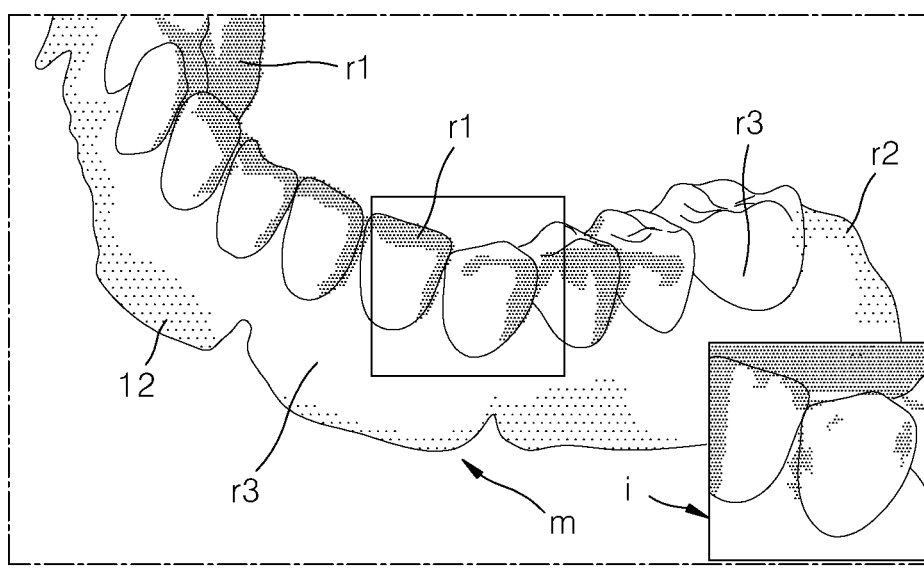
Figure 15:
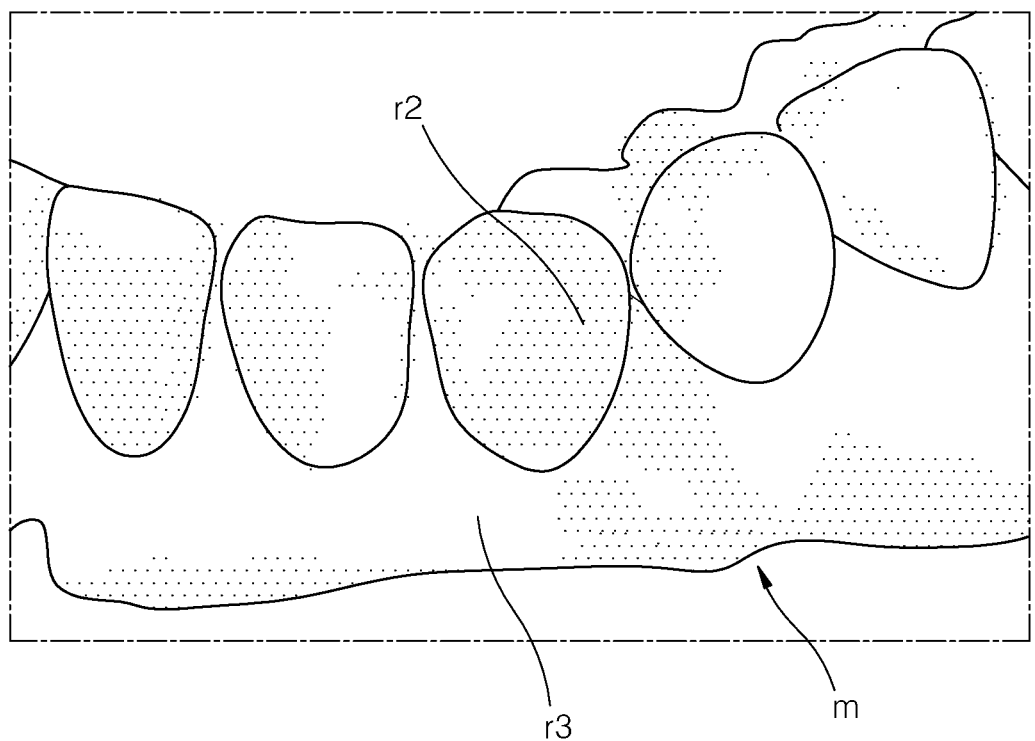

FIGS. 13 to 15 are diagrams illustrating 3-D models displayed using the image processing method according to the present disclosure.

FIG. 13 illustrates an initial execution process of the aforementioned image processing method. The generation of a 3-D model "m" may be displayed in real time on one side of a user interface (UI), and image data "i" obtained in real time may be displayed on the other side of the UI. Reliability indication means is clearly indicated in most of areas of the 3-D model "m" because an overall density of data in a voxel is low in the initial execution process of the image processing method. For example, the generated 3-D model "m" is represented to generally have a first reliability color "r1." The first reliability color "r1", a second reliability color "r2", and a third reliability color "r3" are illustrative. A given pattern or different transparency having the same color may be used.

From FIG. 14, it may be seen that as the density of data is increased, object representation information in the texture mode appear in some voxels. As the density of data is increased and an indication level is increased, reliability indication means changes into the second reliability color "r2" or the third reliability color "r3" and gradually disappears. Only object representation information (e.g., a shape of an object or a color of the object) may be displayed. Furthermore, referring to FIG. 15, most of reliability indication means in the reliability mode may disappear, and object representation information in the texture mode may appear. Since the 3-D model is displayed to include both the reliability mode and the texture mode, reliability indication means may be indicated in a portion having low reliability, and object representation information may be indicated in a portion having high reliability. Accordingly, there are advantages in that a user can easily check a portion having low reliability and can obtain a 3-D model having generally high reliability.

The aforementioned contents have been described based on the density of data, but correspond to an example. For another example, reliability may mean a scan angle, and reliability can be improved by scanning an object at various scan angles. In this case, the range of the scan angle may be divided as described above. Reliability can be obtained by obtaining the density of data for each scan angle range. Furthermore, reliability may be obtained by individually accumulating data at each scan angle.

Hereinafter, an image processing apparatus according to the present disclosure is described. A description of a portion redundant with that in the aforementioned image processing method according to the present disclosure is partially omitted.

Figure 16:
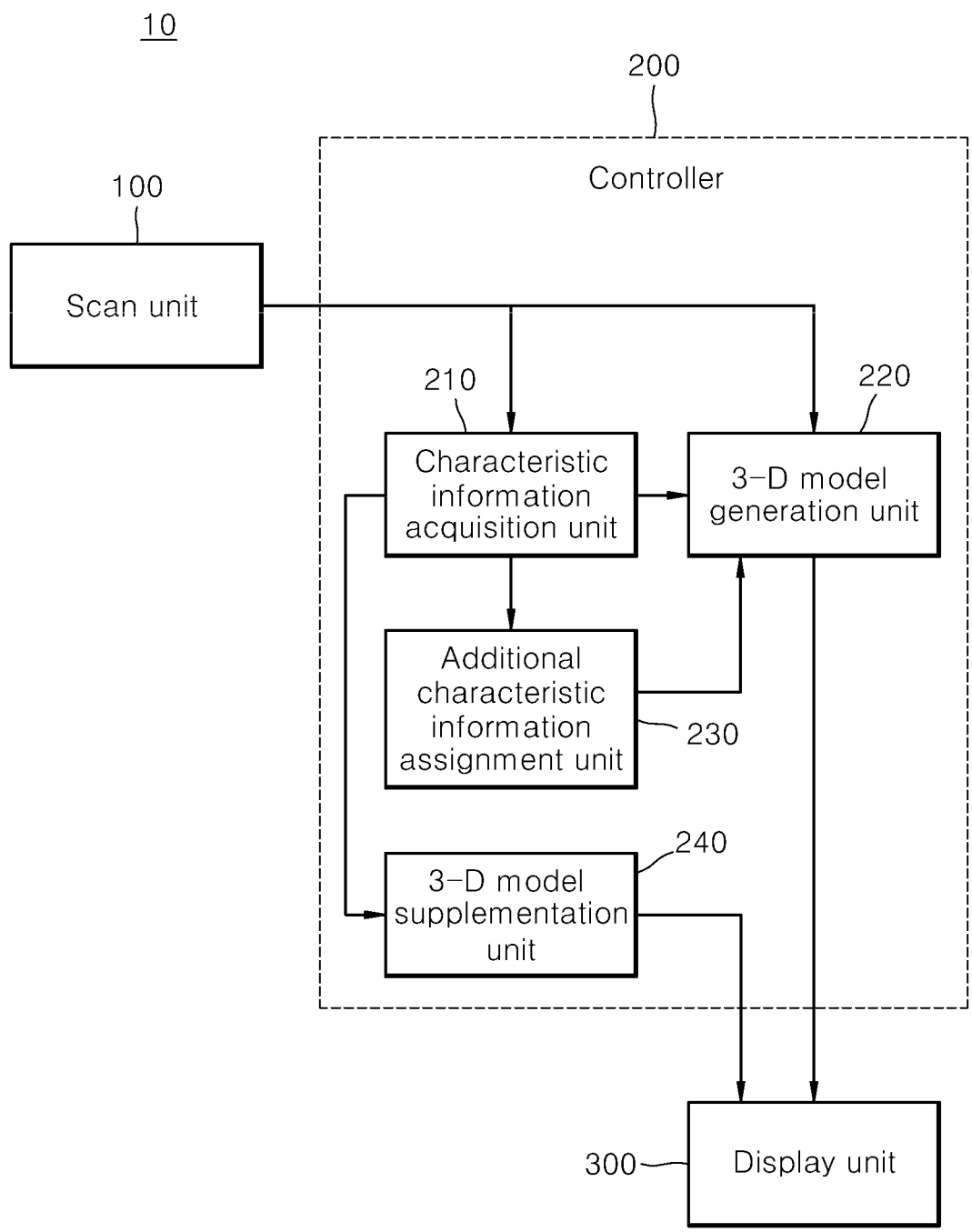
FIG. 16 is a construction diagram of an image processing apparatus according to the present disclosure.

FIG. 16 is a construction diagram of the image processing apparatus according to the present disclosure.

Referring to FIG. 16, the image processing apparatus 10 according to the present disclosure may include a scan unit 100 configured to scan an object, a controller 200 configured to generate a 3-D model having at least two different representation modes from a plurality of image data of the object, and a display unit 300 configured to display the 3-D model having the at least two different representation modes.

The scan unit 100 obtains image data by scanning an object (e.g., the inside of a mouth including teeth and gums of a patient). The image data may be a shot of two-dimensional (2-D) image data or 3-D image data. The scan unit 100 may include a camera for photographing an object. Light reflected by a surface of an object is received through the lens of the camera. Furthermore, the scan unit 100 may have an image sensor electrically connected to the camera. The image sensor may generate image data from light received in the camera. A color image sensor, such as a CCD sensor or a CMOS sensor, may be used as the image sensor. Image data obtained by the scan unit 100 is transmitted to the controller 200.

As described above, the scan unit 100 may be a handheld intraoral scanner. The handheld intraoral scanner may display a 3-D model on the display unit 300 in real time while obtaining image data. Furthermore, the scan unit 100 may be a 3-D table scanner. The 3-D table scanner may obtain image data and display a completed final processing model on the display unit 300.

The controller 200 obtains characteristic information from image data and generates a 3-D model having the characteristic information. The characteristic information may include reliability and object representation information.

The controller 200 may include a characteristic information acquisition unit 210 configured to obtain characteristic information from image data and a 3-D model generation unit 220 configured to generate a 3-D model from the obtained characteristic information and the image data. At least one of the known methods using a laser, a marker, and structured light may be used as a method of obtaining a 3-D model from image data.

A 3-D model may include characteristic information. The characteristic information may mean parameters that represent a feature or property of image data obtained by scanning an object. More specifically, the 3-D model may have characteristic information, including reliability and object representation information indicative of features, such as a color, shape, etc. of an object. In this case, the reliability may include at least one of the density of data corresponding to an overlap area between image data and a scan angle. The image data includes at least one pixel. The 3-D model may include a voxel having a given volume at a location corresponding to a pixel. The 3-D model includes both reliability used in the reliability mode and object representation information used in the texture mode, based on obtained characteristic information. Accordingly, when a 3-D model is displayed on the display unit 300, both the reliability mode and the texture mode may be displayed on the display unit 300.

The reliability mode and the texture mode may be overlaid and displayed. More specifically, the reliability mode may be overlaid and displayed on the texture mode. Accordingly, the reliability mode may be displayed in a voxel having low reliability in a 3-D model. The texture mode may be displayed in a voxel having high reliability in a 3-D model.

Hereinafter, the density of an object is used to describe reliability, that is, characteristic information in the reliability mode. However, the density of an object is illustrative, and a scan angle of an object scanned by the scan unit 100 may be used as reliability.

In the reliability mode, reliability indication means may be changed based on the density of data. The reliability indication means may mean at least one of a given color, a pattern, or transparency. In the density of data, data may be accumulated by continuously obtaining image data at a given point or area of an object. Image data may be aligned and accumulated so that portions overlapped between neighboring image data are connected when a plurality of image data is obtained.

The characteristic information may further include a reliability indication level corresponding to the density of data. For example, the densities of data may be classified into at least two reliability indication levels each having a given section based on the number of data. The controller 200 may further include an additional characteristic information assignment unit 230 configured to assign a corresponding reliability indication level based on the density of data. In this case, the additional characteristic information assignment unit 230 may additionally assign information derived from characteristic information obtained by the characteristic information acquisition unit 210 and obtained by processing the characteristic information. For example, the additional characteristic information assignment unit 230 may assign, to a voxel corresponding to a 3-D model, a reliability indication level generated as a new classification criterion based on the density of data.

Furthermore, the additional characteristic information assignment unit 230 may additionally assign given reliability indication mean for each reliability indication level. The reliability indication means may be at least any one of a given color, transparency, or a pattern.

For example, if reliability indication means is a given color, a reliability color assigned to the same voxel and a color of an object may be synthesized and displayed on the display unit 300. As the density of data is increased, a reliability indication level is also increased. As the reliability indication level is increased according to Equation 1 or 2, a ratio of reliability indication means (e.g., reliability color) is gradually decreased. In contrast, as the density of data is increased, a ratio of texture indication means on the texture mode side is gradually increased. As a result, when a sufficient amount of data is accumulated, the reliability indication means disappears, and only object representation information remains. Accordingly, a user can check both reliability of a 3-D model and object representation information of the 3-D model. Accordingly, since a displayed color of a voxel is gradually changed through the synthesis of two colors according to a ratio, a user can easily check reliability information of a 3-D model and object representation information of the 3-D model.

The additional characteristic information assignment unit 230 may assign different transparency for each reliability indication level in a voxel of a 3-D model. The assignment of such transparency may be differentially distinguished and assigned for each reliability indication level. However, even in this case, if the densities of data are classified in a sufficiently many number of reliability indication levels, reliability indication means may gradually disappear based on the density of the data.

The additional characteristic information assignment unit 230 may divide and assign transparency information, derived from the density of data, based on the number of reliability indication levels in the range of 0% to 100%. For example, transparency of 0% may be assigned in a first reliability indication level, transparency of 25% may be assigned in a second reliability indication level, transparency of 50% may be assigned in a third reliability indication level, transparency of 75% may be assigned in a fourth reliability indication level, and transparency of 100% may be assigned in a fifth reliability indication level. Accordingly, as the density of data is increased, the indication level is also increased and the transparency is increased. As a result, reliability indication means may disappear, and only object representation information in the texture mode may be indicated.

The characteristic information acquisition unit 210 may update the density of data in response to the acquisition of image data. The density of data may be updated up to a critical density. For example, if a critical density is 400 times and 400 data has been accumulated in a specific voxel, it may be determined that a sufficient amount of data has been obtained in the corresponding voxel, and additional data may not be accumulated. A storage space can be prevented from being unnecessarily used and system resources can be reduced because additional data is not accumulated in a voxel in which the density of data has reached a critical density.

Furthermore, the density of data has at least two sub-critical densities depending on a scan angle range of image data. The density of data may be updated may be updated up to only a sub-critical density for each scan angle range. For example, when the scan unit 100 scans an object, an angle at which scanning will be started may be set to 0°, and a range having a given angle from both sides of the start angle 0° may be divided into a first scan angle range, and a second scan angle range and a third scan angle range neighboring the first scan angle range. Each of the scan angle ranges may have a sub-critical density. The sub-critical densities may be the same.

The controller 200 may further include a 3-D model supplementation unit 240 configured to supplement the density of data based on a sub-critical density for each scan angle range. The 3-D model supplementation unit 240 may obtain a 3-D model having high reliability by scanning a given voxel in multiple directions. For example, if a first scan angle range for a specific voxel has reached a critical density of the first scan angle range and each of a second scan angle range and a third scan angle range has not reached a critical density of each of the second scan angle range and the third scan angle range, reliability of a 3-D model may be improved by performing scanning in the second scan angle range and the third scan angle range.

In particular, if a plurality of scan angle ranges is present, the 3-D model supplementation unit 240 may control the display unit 300 to indicate a scan angle range having the lowest density of data. For example, if the scan unit 100 is disposed in a first scan angle range and a second scan angle range has the lowest density of data, the 3-D model supplementation unit 240 may display a notification message, such as "Incline to the left and perform scanning", on the display unit 300. A user can recognize a corresponding message, etc., and can obtain a 3-D model having higher reliability by additionally performing scanning in a scan angle range in which the density of data has not reached a sub-critical density.

The above description is merely a description of the technical spirit of the present disclosure, and those skilled in the art may change and modify the present disclosure in various ways without departing from the essential characteristic of the present disclosure.

Accordingly, the embodiments described in the present disclosure should not be construed as limiting the technical spirit of the present disclosure, but should be construed as describing the technical spirit of the present disclosure. The technical spirit of the present disclosure is not restricted by the embodiments. The range of protection of the present disclosure should be construed based on the following claims, and all of technical spirits within an equivalent range of the present disclosure should be construed as being included in the scope of rights of the present disclosure.

What is claimed is:

1. An image processing method comprising steps of:
   obtaining a plurality of image data from an object;
   generating, from the image data, a three-dimensional (3-D) model having at least two different representation modes; and
   displaying the 3-D model having the at least two different representation modes,
   wherein the representation modes comprise a reliability mode including reliability of the 3-D model obtained by overlap of the image data and a texture mode including object representation information,
   wherein the step of displaying the 3-D model displays the texture mode and the reliability mode of the 3-D model at the same time,
   in the reliability mode, a reliability indication degree of reliability indication means is changed based on the reliability, and
   as the reliability is increased, a ratio of the reliability indication degree is decreased so that the reliability indication means on a reliability mode side of the 3-D model is gradually indicated as a texture indication means on the texture mode side.

2. The image processing method of claim 1, wherein the step of generating the 3-D model comprises steps of:
   obtaining characteristic information from the image data; and
   generating a 3-D model having the characteristic information,
   wherein the characteristic information comprises the reliability and the object representation information.

3. The image processing method of claim 2, wherein the reliability comprises at least one of a density of the image data and a scan angle at which the image data is scanned.

4. The image processing method of claim 1, wherein the reliability mode and the texture mode are overlaid and displayed.

5. The image processing method of claim 1, wherein:
   in the reliability mode, the reliability is indicated by given reliability indication means, and
   the reliability indication means is at least one of a given color, a pattern or transparency.

6. The image processing method of claim 1, wherein:
   in the texture mode, a texture indication degree of texture indication means indicative of the object representation information is changed based on the reliability, and
   as the reliability is increased, a ratio of the texture indication degree is increased.

7. The image processing method of claim 1, wherein as the reliability is increased, a ratio of a texture indication degree is increased, and a ratio of a reliability indication degree is decreased.

8. The image processing method of claim 1, wherein the reliability is divided into at least two reliability indication levels,
   different transparency is assigned to the reliability indication levels for each reliability indication level, and
   the transparency is differentially assigned based on the reliability indication level.

9. An image processing apparatus comprising:
   a scan unit configured to scan an object; and
   a display unit,
   wherein the image processing apparatus is configured to generate a three-dimensional (3-D) model having at least two different representation modes from a plurality of image data of the object;
   wherein the display unit displays the 3-D model having the at least two different representation modes,
   wherein the representation modes comprise a reliability mode including reliability of the 3-D model obtained by overlap of the image data and a texture mode including object representation information,
   wherein the display unit displays the texture mode and the reliability mode of the 3-D model at the same time,
   in the reliability mode, a reliability indication degree of reliability indication means is changed based on the reliability, and
   as the reliability is increased, a ratio of the reliability indication degree is decreased so that the reliability indication means on a reliability mode side of the 3-D model is gradually indicated as a texture indication means on the texture mode side.

10. The image processing apparatus of claim 9, wherein:
    the controller obtains characteristic information from the image data, and generates a 3-D model having the characteristic information, and
    the characteristic information comprises the reliability and the object representation information.

11. The image processing apparatus of claim 10, wherein the reliability comprises at least one of a density of the image data and a scan angle at which the image data is scanned.

12. The image processing apparatus of claim 9, wherein the reliability mode and the texture mode are overlaid and displayed.

13. The image processing apparatus of claim 9, wherein:
    the controller indicates the reliability by using given reliability indication means, and
    the reliability indication means is at least one of a given color, a pattern or transparency.

14. The image processing apparatus of claim 11, wherein:
    in the texture mode, a texture indication degree of texture indication means indicative of the object representation information is changed based on the reliability, and
    as the reliability is increased, a ratio of the texture indication degree is increased.

15. The image processing apparatus of claim 11, wherein as the reliability is increased, a ratio of a texture indication degree is increased, and a ratio of a reliability indication degree is decreased.

16. The image processing apparatus of claim 9, wherein the reliability is divided into at least two reliability indication levels, the controller assigns different transparency for each reliability indication level, and the transparency is differentially assigned based on the reliability indication level.

* * * * *